33-246. OR 3,213,539 SR
SEARCH ROOM

Oct. 26, 1965 D. J. BURRIS 3,213,539

ADJUSTABLE RETICLE ASSEMBLY FOR OPTICAL SIGHTING DEVICES

Filed March 4, 1963

INVENTOR.
DONALD J. BURRIS
BY Anderson, Spangler & Wymore
ATTORNEYS

3,213,539
ADJUSTABLE RETICLE ASSEMBLY FOR OPTICAL SIGHTING DEVICES

Donald J. Burris, Broomfield, Colo., assignor to Redfield Gun Sight Company, Denver, Colo., a limited partnership of Colorado

Filed Mar. 4, 1963, Ser. No. 262,505
7 Claims. (Cl. 33—50)

This invention relates to an alignable reticle assembly for optical sighting devices such as riflescopes.

In co-pending application Serial No. 173,922, now Patent No. 3,161,716 filed February 19, 1962 and entitled "Riflescope" of which I am a co-inventor and which is assigned in its entirety to the same assignee as this application, we disclosed a reticle that is axially adjustable to position same in the second focal plane of the optical system, rotarially for the purpose of producing the desired vertical and horizontal relation between the crossed hairs, and radially to locate the intersection of the crossed fibers or other sighting point precisely on the optical axis of the lens system. Axial adjustment to place the reticle in the second image plane is accomplished by mounting the reticle in an externally-threaded collar which is, in turn, screwed into the internally-threaded end of the erector lens tube. Rotational adjustment is taken care of by merely turning the reticle within the collar until the crossed hairs are in the desired position. Radial adjustment, on the other hand, necessitated the use of a crosshair supporting ring as a part of the reticle whose outside diameter was less than the inside diameter of the collar measured at the top of the lands on the threads. Thus, the reticle could be moved in any direction in the plane of the crossed hairs to place the intersection thereof on the optical axis. Once the necessary rotational and radial adjustments have been made, the reticle is held in place by tightening a lock ring thereagainst.

Unfortunately, I have discovered certain difficulties in connection with the foregoing reticle adjustment system, the principal one being that it will not stay adjusted under the substantial shock load that results when the rifle on which the scope is mounted is fired. Obviously, any shift in the reticle once it has been properly adjusted renders the scope useless as a means for aiming a firearm. Even cementing the reticle in adjusted position is not entirely effective to eliminate movement thereof.

As a result of the difficulties I have experienced in maintaining reticle alignment in a riflescope by means of the adjustable reticle mount disclosed in our earlier co-pending application above identified, I have now developed independently an improved reticle adjustment system that eliminates the above problems. It is this reticle adjustment system that forms the subject matter of the present application. Its maximum utility is attained in variable power riflescopes of the type disclosed and claimed in application Serial No. 173,922 and reference should be made to this application for details concerning the reasons for requiring an adjustable system capable of precisely positioning the sighting point relative to the optical system; however, the use of the advantages derived from the instant invention are by no means limited to variable power riflescopes as other optical sighting devices with reticles therein may well be benefitted by this same adjustment feature.

It is, therefore, the principal object of the present invention to provide a novel and improved reticle adjustment assembly for riflescopes that eliminates the foregoing problem of the reticle shifting under shock loads.

Another objective is the provision of a reticle adjustment mechanism which utilizes both set screws and a resilient mounting to insure a positive mechanical interlock.

Still another objective of the invention herein disclosed and claimed is to provide means for making the necessary adjustment in the reticle of a riflescope that is quite simple to use yet extremely precise.

An additional object is the provision of an internal reticle adjustment mechanism that is very compact and requires no more space inside the barrel or erector lens tube than the prior art systems for this same purpose.

Further objectives are to provide means for accomplishing radial, rotational and axial adjustment of a riflescope reticle relative to the optical axis that is easily adaptable to the various types and designs of riflescopes together with other optical sighting devices.

Other objects will be in part apparent and in part pointed out specifically hereinafter in connection with the description of the drawings that follows, and in which.

Figure 1:
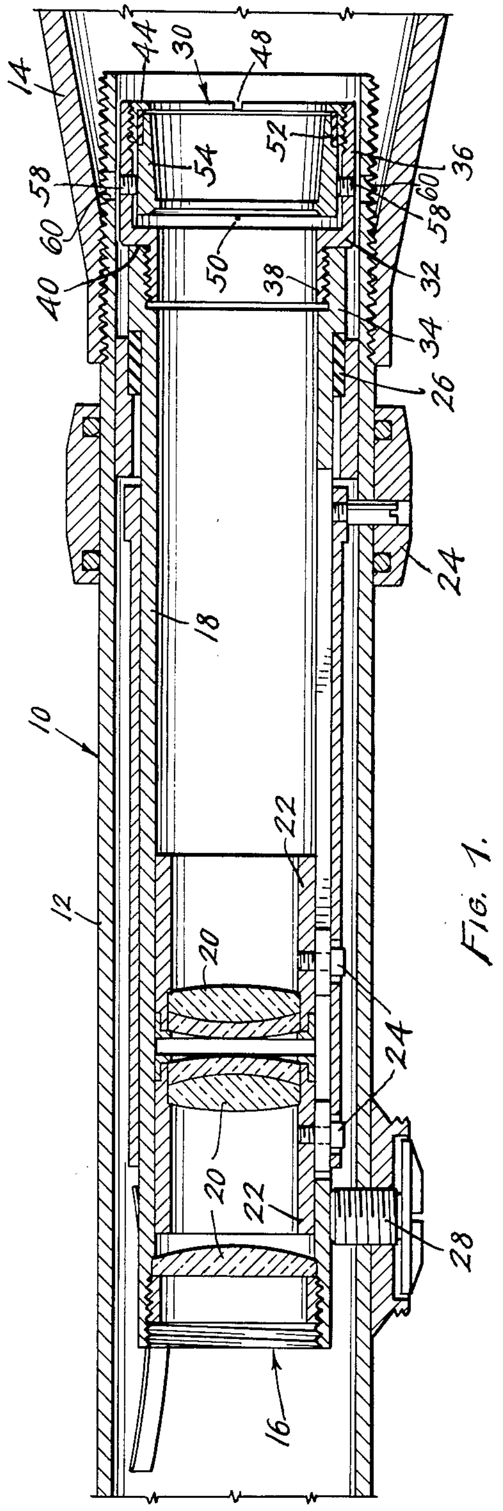
FIGURE 1 is a fragmentary diametrical section showing the erector lens system of a riflescope mounted within the scope barrel and the reticle adjustment assembly of the present invention located in the end of the erector lens tube.
Figure 2:
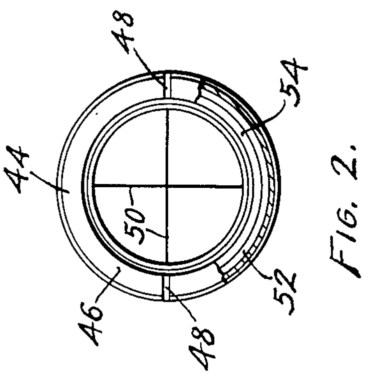
FIGURE 2 is an end view of the reticle, mounting ring and resilient coupling therebetween, portions of the mounting ring having been broken away and shown in section to better reveal the interior construction.
Figure 3:
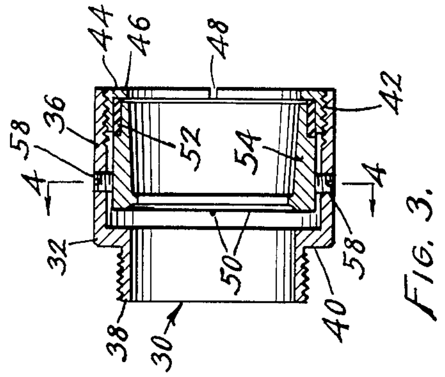
FIGURE 3 is a diametrical section showing the entire reticle adjustment assembly including the subassembly of FIGURE 2 and the set screw collar that threads into the erector lens tube forming a continuation of the latter; and, FIGURE 4 is a section taken along line 4—4 of FIGURE 3.

Referring now to the drawings for a detailed description of the present invention and, initially, to FIGURE 1 for this purpose, it will be seen that reference numeral 10 represents in a general way a riflescope of the type having a main barrel 12, an eyepiece lens assembly 14 at the near end of the barrel and an objective lens assembly (not shown) at the far end. Inside the scope barrel is located an erector lens system that has been broadly designated with reference numeral 16 that includes an erector lens tube 18, lenses 20 together with their mounts 22, and the system 24 by which the spacing between the erector lenses are varied through manipulation of an external control, the latter having been described in detail in the previously mentioned co-pending application. Also included is the resilient mounting 26 by means of which the erector lens system is coupled to the main scope barrel in a manner to permit windage and elevation corrections to be introduced into the optical system through the use of screw adjustors 28, only one of which has been shown.

The foregoing elements of the riflescope have been illustrated merely to show the environment in which the reticle adjustment assembly that forms the subject matter of the instant application are located and, while a number of features of the scope are considered novel, they form the subject matter of the co-pending application that has already been referred to repeatedly herein. It is significant to note, however, that the riflescope shown in FIGURE 1 is merely representative of any one of a number of different optical sighting devices requiring a reticle that could use the reticle adjustment assembly of the present invention either in their present form or with slight modification.

The essence of the instant invention, therefore, lies in the reticle adjustment assembly that has been broadly designated by reference numeral 30 and for a detailed description of which, reference will be made to all four figures of the drawings. The near or rear end of the erector lens tube 18 is provided with a collar 32 that forms an extension thereof and carries the remaining elements of the reticle adjustment assembly that will be described presently. In the particular form shown, the rear end of the erector lens tube is provided with an internally-threaded annular enlargement 34 which accepts the collar 32 so as to leave the internal diameter the same and thus pass as much light as possible to the eyepiece. The collar 32 is, likewise, formed to provide an annular enlarged section 36 of even greater diameter than the inside of the erector lens tube 18. The externally-threaded front section 38 of the collar that screws into the erector lens tube is separated from the enlarged section 36 by an annular shoulder 40 which, in assembled position, abuts the rear end of the erector tube. The rearmost portion 42 of the enlarged section 36 in the collar 32 is internally-threaded to receive ring 44.

Ring 44 is provided with an inwardly extending annular flange 46 that is provided with a diametrically-positioned pair of slots 48 adapted to receive a suitable tool for screwing same into the internally-threaded portion 42 of the collar. The threads on the collar and ring preferably mate with a rather tight fit because it is this threaded connection that is used to accomplish both the rotational and axial adjustment of the reticle and it is important that no relative motion therebetween take place once the desired adjustment has been accomplished. As aforementioned, axial adjustment of the reticle is necessary to place the crossed hairs 50 of the reticle in the second image plane of the optical system, the reasons for this requirement being set forth in considerable detail in co-pending application Serial Number 173,922. For present purposes, however, it is sufficient to note that axial adjustment is made possible through the use of the threaded connection between the collar and ring. As for the rotational adjustment of the reticle, this, once again, is to place the crossed hairs 50 on vertical and horizontal axes thereby facilitating windage and elevation corrections. It is obvious that some axial shift in the crossed hairs will take place when the ring is rotated in the collars so as to produce the necessary vertical and horizontal orientation of said hairs; however, the maximum rotation that would be required is one-eighth turn and the pitch of the threads is such that displacement of the crossed hairs out of the second image plane would be in the neighborhood of a thousandth of an inch or so which is negligible. In fact, the overlapping of the crossed hairs at their intersection introduces an error of about the same order of magnitude.

Inside ring 44 in position to abut the annular flange 46 is positioned a resilient coupling 52 that is similar in function and design to the one (26) that mounts the erector lens tube inside the main barrel. This resilient coupling is in the shape of a continuous annular band and is formed of rubber or some similar deformable elastic material. The external cylindrical surface thereof is bonded tightly to the inside surface of the ring while the opposite surface is similarly attached to the outside of the crossed-hair mounting ring 54, that also functions as a diaphragm to limit the field of view. Diaphragm ring 54 has the outside surface thereof provided with an annular section of reduced diameter 56 adapted to receive this resilient coupling.

The outside diameter of diaphragm 54 is substantially less than the inside diameter of section 36 of the collar 32 in which said diaphragm is located; therefore, coupling 52 provides a yieldable connection that allows for limited radial adjustment of said diaphragm and crossed hairs supported thereon relative to ring 44 and collar 36, the latter elements occupying a fixed relationship to one another insofar as radial movement is concerned. Actual radial adjustment of the reticle mount or diaphragm and crossed hairs to place the intersection of the latter precisely on the optical axis of the erector lens system is accomplished by means of four set screws 58 that are threaded through the collar into engagement with the external surface of the diaphragm-forming mount. In the particular form shown, a set screw is located to engage the diaphragm ring 54 adjacent the points of attachment of the filaments thereto that form the crossed-hairs 50. Thus, by adjusting the horizontally-disposed pair of set screws, the sighting point defined by the intersection of the crossed filaments can be moved to the right or left. Similarly, the vertically-disposed pair of set screws enable the sighting point to be raised or lowered. A combination of these adjustments permits the sighting point to be located precisely on the optical axis of the erector lens system which is especially significant in a variable power scope such as that shown in FIGURE 1; otherwise, the sighting point will shift as the degree of magnification is changed, the latter phenomenon being fully explained in the parent application already identified.

The actual adjustments in the reticle must, of course, be made with the reticle assembly mounted in the erector lens tube and the latter mounted in the main scope barrel. The eyepiece lens assembly, however, may be left off as the desired adjustments relate only to the erector and objective lens systems. Even so, apertures 60 (FIGURE 1) must be provided in the main scope barrel aligned with the set screws to permit insertion of a screwdriver or similar aligning tool. The eyepiece lens holder is, of course, removed during this operation.

Figure 4:
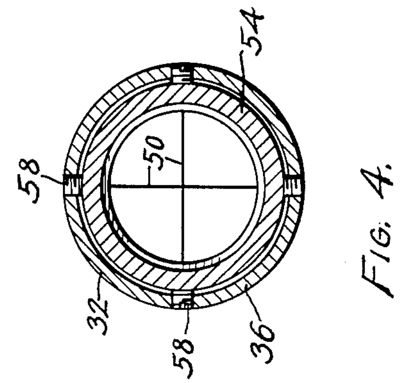

Once proper alignment has been achieved it is desirable, although not always necessary, to place a drop of cement on each set screw and also the threaded connection 42 between the collar 32 and ring 44. It should be mentioned that arranging the set screws as shown in FIGURE 4 facilitates the radial adjustment of the reticle and is, therefore, preferred; however, care must be exercised during this alignment operation to insure that the reticle mount is not deformed by undue pressure thereon exerted by the set screws. Any deformation of this nature will likely cause slack to develop in one filament while producing undue tension in the other that might even cause it to break. This is no problem with skilled personnel as they will merely back off the set screw lying in the direction of intended reticle movement preparatory to screwing in the one opposite thereto, nor is it a problem with etched reticles in which no filament relaxation can occur. Filament tension can, however, be largely controlled by rotating the collar 45° thus letting the set screws bear against diaphragm ring 54 midway between the points where the filaments are attached thereto. When this is done, any deformation of the diaphragm caused by undue set screw pressure will produce only a slight, but substantially equal, increase in the tension in both filaments. The obvious disadvantage to this arrangement is that all four set screws must be readjutsed to accomplish either a horizontal or vertical shift in the sighting point.

Having thus described the several useful and novel features embodied in the improved reticle adjustment assembly of the present invention, it will be apparent that the several worthwhile objectives for which it was developed have been achieved. Although but a single specific embodiment has been shown and described herein, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. In an optical sighting device of the type having objective and eyepiece lens systems mounted in opposite extremities of a barrel, a tube mounted in the barrel intermediate the ends thereof containing image-erecting lenses, and a reticle defining a sighting point that is required to be positioned in one of the image planes of the optical system as well as on the optical axis of one of said lens systems, the improved adjustable reticle mount which comprises: a tubular collar attachable to the tube mounting the erector lens system on whose optical axis the sighting point is to be located, a ring threadable into the end of the collar providing means for accomplishing both axial and rotational relative movement therebetween, a deformable elastic coupling attached to the inside of the threaded ring, a diaphragm-forming ring attached to the inside of the elastic coupling, said diaphragm having a tubular portion projecting beyond the elastic coupling into the collar, said projecting portion being of lesser outside diameter than the inside diameter of the collar to leave an annular gap therebetween, means defining a sighting point mounted in the diaphragm, and adjustment means mounted for radial movement interconnecting the collar and projecting portion of the diaphragm adapted upon actuation to vary the width of the gap therebetween through deformation of the elastic coupling.

2. The improved adjustable reticle mount as set forth in claim 1 in which the adjustment means comprises angularly-spaced set screws threaded through the collar into contact with the projecting portion of the diaphragm.

3. The improved adjustable reticle mount as set forth in claim 1 in which the elastic coupling comprises an annular band of rubber bonded to opposed surfaces of the diaphragm and threaded ring.

4. The improved adjustable reticle mount as set forth in claim 1 in which the diaphragm is provided with an external annular section of reduced diameter and the threaded ring with an internal annular section of increased diameter arranged in opposed relation to one another and adapted to receive the elastic coupling therebetween.

5. The improved adjustable reticle mount as set forth in claim 2 in which at least three set screws are employed arranged in equal-angularly spaced relation around the periphery of the diaphragm.

6. The improved adjustable reticle mount as set forth in claim 2 in which four set screws are used and spaced apart angularly 90°.

7. The improved adjustable reticle mount as set forth in claim 2 in which the means defining the sighting point comprises crossed hairs intersecting one another at right angles with one extending vertically and the other horizontal, and in which a set screw is located to bear against the diaphragm at the extremities of each hair.

References Cited by the Examiner

UNITED STATES PATENTS

| | | | |
|---|---|---|---|
| 1,167,164 | 1/16 | Grebe | 88—32 |
| 1,722,520 | 7/29 | Glancy. | |
| 2,696,052 | 12/54 | Czarnikow. | |
| 2,858,732 | 11/58 | Kollmorgen | 33—50.5 X |
| 2,948,188 | 8/60 | Kollmorgen | 33—50.5 X |

FOREIGN PATENTS

| | | |
|---|---|---|
| 47,506 | 4/11 | Austria. |

ISAAC LISANN, *Primary Examiner.*